United States Patent [19]
Simon et al.

[11] 4,007,377
[45] Feb. 8, 1977

[54] OPTICAL SCANNING SYSTEM FOR UNIVERSAL PRODUCT CODE

[75] Inventors: Donald R. Simon, Wayne, N.J.; Anil Vasudeva, San Jose, Calif.; John J. Zukatus, Jr., Nutley, N.J.

[73] Assignee: The Singer Company, New York, N.Y.

[22] Filed: Sept. 8, 1975

[21] Appl. No.: 611,362

[52] U.S. Cl. .................... 250/566; 235/61.11 E; 250/568
[51] Int. Cl.² ...................................... G06K 7/10
[58] Field of Search .......... 250/567, 566, 568, 230, 250/227, 214 P; 235/61.11 E, 61.11 D

[56] References Cited

UNITED STATES PATENTS

| | | | |
|---|---|---|---|
| 3,184,732 | 5/1965 | Haynes | 250/227 |
| 3,652,154 | 3/1972 | Gebel | 250/214 P |
| 3,796,863 | 3/1974 | Nickl et al. | 250/568 |
| 3,836,260 | 9/1974 | Ulyanov | 250/230 |
| 3,916,158 | 10/1975 | Sansome | 235/61.11 E |
| 3,922,539 | 11/1975 | Carnes et al. | 250/568 |

OTHER PUBLICATIONS

B382,783, Jan. 1975, Bowen et al., 235/61.11 E.

*Primary Examiner*—Alfred E. Smith
*Assistant Examiner*—David K. Moore
*Attorney, Agent, or Firm*—Edward L. Bell; Robert E. Smith; Charles R. Lewis

[57] ABSTRACT

A scanning system for supermarket check-out counters or the like, in which a package bearing the universal product code symbol is passed over a scanning window where the code symbol is scanned by a laser-generated and galvanometer-deflected light beam. The complex saw toothed laser scanning pattern, produced by a programmable read-only memory controlled galvanometer system, intercepts the coded symbol, regardless of its orientation, at high symbol speeds and permits higher than normal instantaneous laser power while conforming to safety standards prescribed by the Federal Bureau of Radiological Health. The beam reflected from the coded symbol is collected via a low-cost fiber optic bundle in a photomultiplier, and the video signal is processed in simple circuitry into a square wave signal suitable for subsequent digital computing equipment.

9 Claims, 9 Drawing Figures

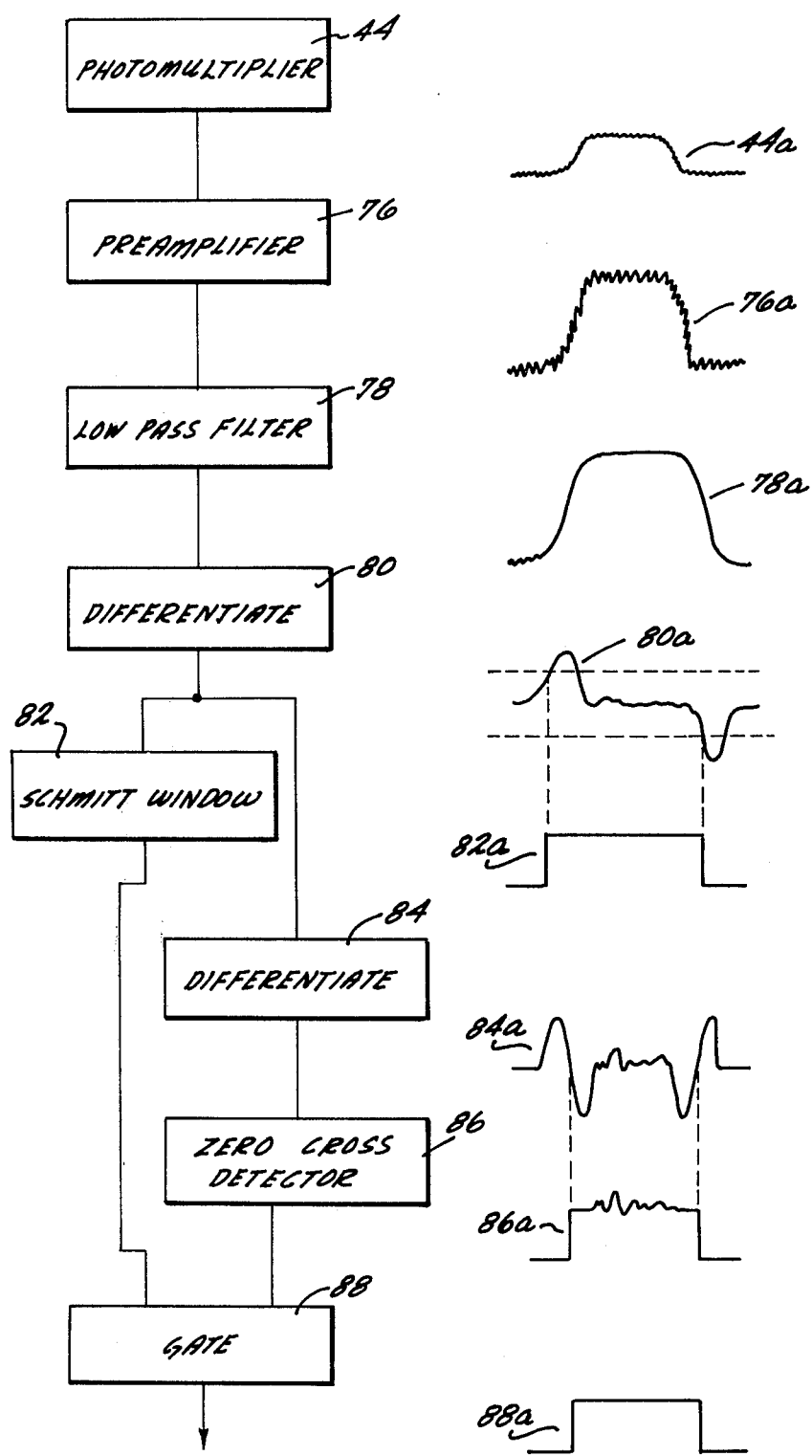

OPTICAL SCANNING SYSTEM FOR UNIVERSAL PRODUCT CODE

This invention relates to systems for scanning high-density, self-clocking code and more specifically to an automatic data acquisition system based upon the universal product code symbol which has been adopted for use by the grocery industry. The UPC symbol, which is generally printed on the labels of grocery items, is based upon optical contrast and contains areas of dark bars separated by light spaces. The encoded information is represented by the relative widths of the bars and spaces so that the code represented by the symbol may be determined by measuring these relative widths by scanning the symbols as they pass over a detecting region, and by noting the spacial variations in contrast in ligh reflected from the symbol. This reflected light with its information can be sensed and then processed to provide data in a form that can be analyzed by a computer.

For greatest convenience, a scanner for retail grocery applications is mounted under the check-out counter and scans through a transparent window in the counter surface over which the products bearing the UPC symbol are passed. A laser generated pencil of light is suitably deflected to produce a scanning pattern that sweeps over the entire package or product, and a photodetector directed to view through the window will detect the scanning pencil as it passes across the dark and light pattern of the UPC symbol. It is necessary that the intensity of the laser beam or pencil must be sufficient to adequately illuminate the coded symbol under high ambient light and under such conditions that a detectable amount of light scanning the symbol will be reflected back through the window to the photodetector.

It is apparent that high powered laser beams create health hazards that cannot be tolerated in a system in close proximity with the public and accordingly, the Federal Bureau of Radiological Health has imposed a power limitation for this class of operation which, in effect, states that the average power detected through a 7mm aperture must be less than $3.9 \times 10^{-7}$ watts and the average radiance through a 7mm aperture within a solid angle of $10^{-5}$ steradians must be less than $2.0 \times 10^{-3}$ watts $cm^{-2}$ $SR^{-1}$. This power limitation is an important factor in a design of a laser scan pattern since, in a properly designed pattern, it is possible to stay within the prescribed limitations and yet increase the laser power by decreasing the number of scans through any 7mm aperture and also by decreasing the pattern repeat rate. It is obviously most desirable to use the maximum allowable laser power in order to increase the signal strength of the scanner and therefore the reading ability and signal-to-noise ratio of the photosensor.

The scanning repetition rate also warrants careful consideration. While a decrease in the repetition rate may permit use of higher laser power, a higher repetition rate permits more than one reading of a symbol during its pass over the scanning region thereby improving the reading reliability of the system by correlating the data sensed by multiple scans of the same symbol.

Many other factors besides laser power and scan repetition rate will affect the design of a scan pattern. For example, the dimensions of the viewing window, the velocity at which the UPC symbol is passed over the window, and the angle at which the symbol passes the window are all factors that are to be considered in the design of the pattern.

A primary characteristic of the UPC symbol is that it is two dimensional, that is, the bars have a significant length. To read this symbol in an omnidirectional manner, the scan pattern must also be two dimensional, therefore, ruling out the single slot scanner with its simple one dimensional linear scan pattern. the nominal size of a UPC symbol is one inch high and one and one-half inches in width, although the grocery industry has accepted variations in size by use of multipliers starting at 0.85 to a maximum of 1.92. Therefore, the maximum height of a full UPC symbol will be 1.92 inches and the maximum width will be 2.88 inches. The minimum dimensions of the viewing window is that which is necessary to read the largest size half-symbol at its worst orientation, hence the height of the scanning pattern should be approximately two inches to assure the capability of completely traversing all of the bars of a UPC symbol.

The window width should be as large as possible to provide for greatest operator ease in finding the scan region with the symbol, and it is generally accepted that the width of a scan window and hence the width of the scan should be in the order of seven inches.

The maximum velocity at which the UPC pattern can be passed over the scanning window is dependent upon the scan pattern repetition rate, the dimensions of the UPC symbol and the angle at which it passes the scan window. Scan repetition rate is, of course, related to the sweeping velocity of the scanning beam and it has been determined that a realistic laser spot velocity has an upper limit of about 20,000 inches per second if the data rate is to be kept below 2 MHz and if the associated processing electronics are to be kept at a reasonable cost while maintaining higher reliability and accuracy.

Prior art UPC scanners employ either a scanning wheel or a combination of both scanning wheel and galvanometer deflectors to generate the desired scan of a light source such as a laser beam. The scanning wheel is generally a conventional type having a plurality of planar mirrors mounted on the periphery of a wheel rotated by a synchronous motor. The result is a scan pattern that sweeps in one direction across the viewing window so that the symbol is read only in one direction from one guard pattern to center pattern to the opposite guard pattern. Since the UPC symbol consists of two independent halves, each beginning with the guard pattern and reading toward the center pattern, it would greatly simplify the electronics circuitry if the analysis of data was consistently in one direction, i.e., from either guard pattern to the center pattern. In the present invention this is accomplished by a scan pattern which is reversed for alternate complete scan patterns by the use of galvanometer deflectors.

Briefly described, the invention is for a high-density self-clocking bar code scanner utilizing a laser pencil of light that is deflected by galvanometers driven by signals generated in digital circuitry by a read-only-memory. The deflected laser beam generates a complex angular wave pattern that scans in both directions across the scanning window so that the code symbol may be read and decoded from either end of the code pattern thus providing for simplified decode logic circuitry. The scan pattern has a shape and a repetition rate that enables the use of a higher than normal laser beam power thereby improving the detector signal-to-noise ratios while complying with safety regulations prescribed by the Bureau of Radiological Health. The laser beam reflected from the code symbol is detected by a low-cost fiber optic bundle and photomultiplier, and a video signal is processed in simple circuitry into a square wave signal suitable for subsequent digital processing equipment.

In the drawings, which illustrate a preferred embodiment of the invention:

FIG. 5 is a block diagram of the video processor circuitry and illustrates typical signal waveforms produced by each of the various stages of the circuitry.

Figure 1:
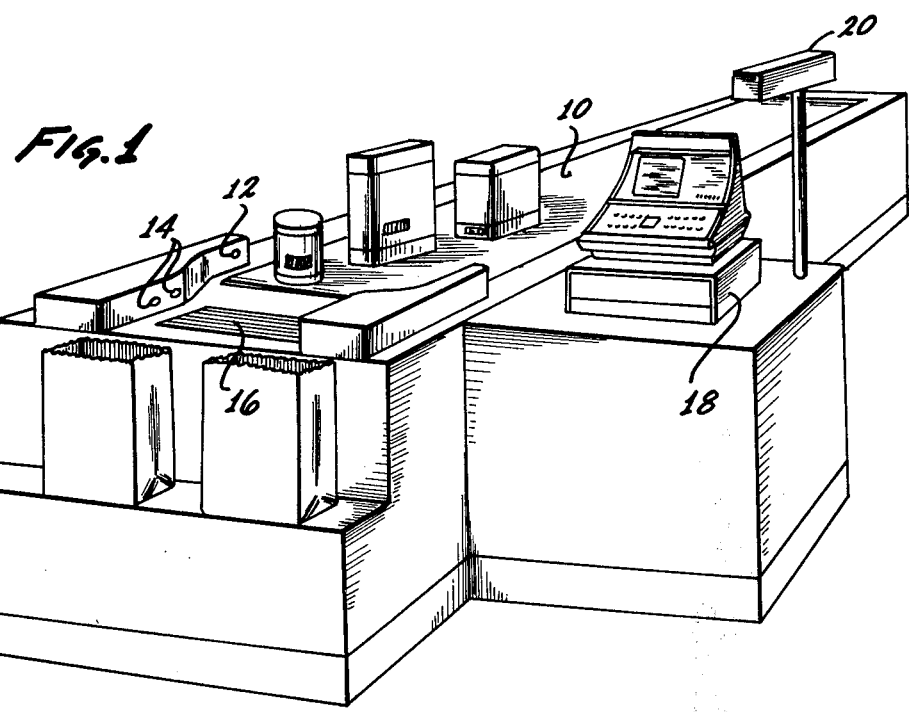
FIG. 1 is a perspective view showing a typical grocery check-out stand containing a product code scanner.

In the typical checkstand configuration illustrated in FIG. 1, products being purchased may be placed upon the conveyer 10 which carries the material to the proximity of the scanning region at which point they will intercept a light beam to a photodetector 12 to stop the motion of the conveyer 10. The checkstand operator may then manually slide each product carrying a Universal Product Code symbol face downward at an angle between 45° and parallel to the scanning window 16 which is housed in the checkstand surface. When the product intercepts the package detector photosensor 14, the scanner "reads" the UPC symbol and transmits the information to a computer which is programmed to adjust the inventory, look up the current price of the product and transmit the price information and product identification to both the point-of-sale terminal 18 and the customer's display 20.

Figure 2:
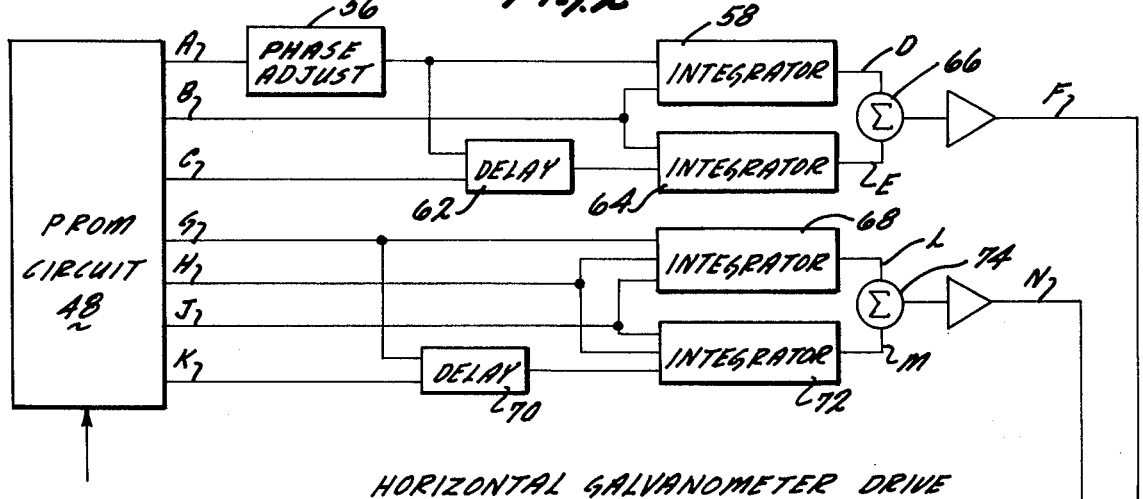
FIG. 2 is a schematic drawing illustrating the general arrangement of the optical elements of the scanner, and also illustrates in block form the galvanometer deflection electronic circuitry.
Figure 2:
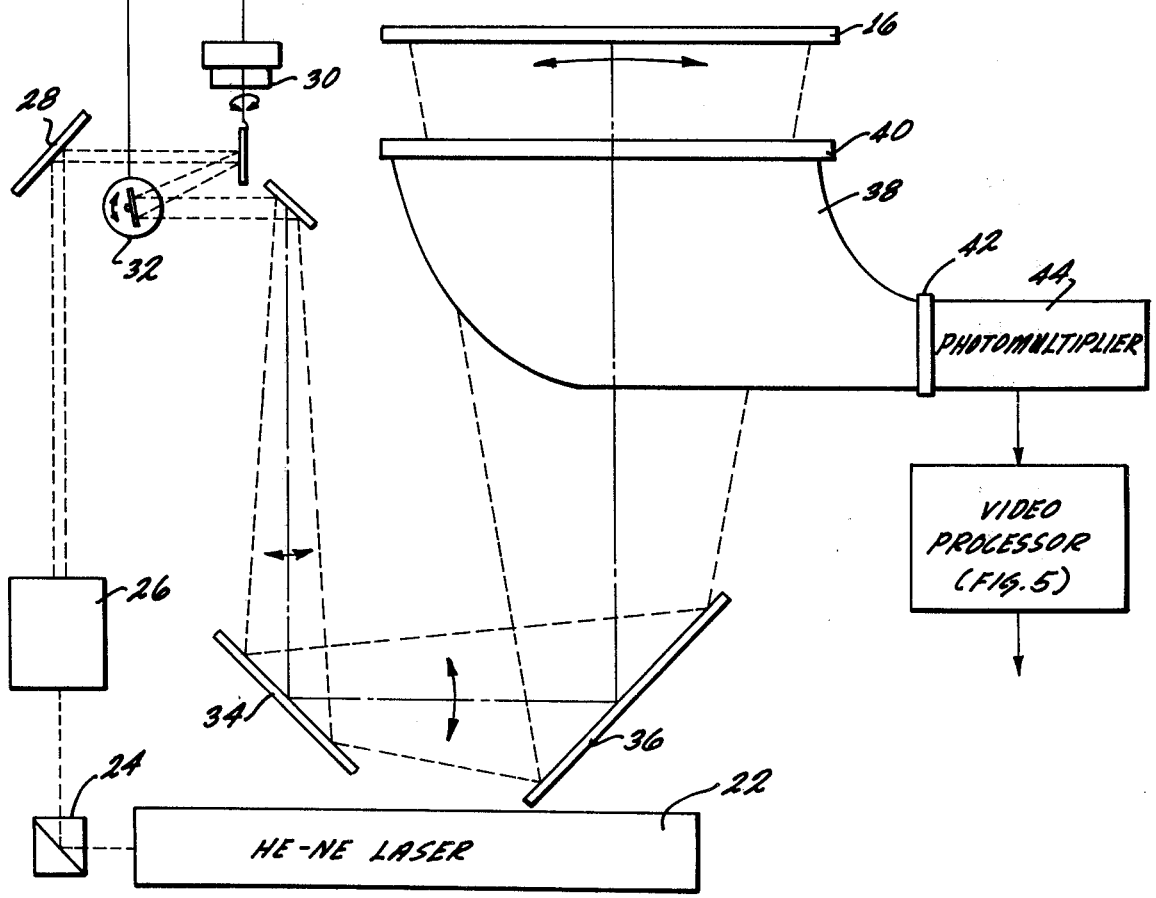

The mechanisms of the scanner are schematically illustrated in FIG. 2 and include a continuous wave helium-neon laser 22 which operates at a wavelength of 623.8 nanometers. The radiation beam from laser 22 is deflected by a mirror 24 into a beam diverger and focusing element 26, the purpose of which is to increase the beam size and focus it to the proper final spot size. The beam from the diverger 26 is folded by a mirror 28 to the reflecting surface of a programmable galvanometer 30 which rotates the beam in both directions along the vertical axis by an amount commanded by the driving circuitry. The beam is then directed to the reflecting surface of a programmable horizontal galvanometer 32 which moves the beam through an angular variation in a plane perpendicular to the plane of the first galvanometer 30 and thereby combines to generate two-dimensional scanning in a pattern which is reflected by mirrors 34 and 36 to the plane of the scanning window 16.

Positioned either forward of, or behind, so that it will not interfere with the scanning laser beam, is a fiber optic bundle 38 having a planar entrance surface 40 with approximately the same horizontal dimension as the window 16. Surface 40 faces the scanning window 16 so that it may receive a scanning beam that is reflected from a UPC symbol on a product that is swept above the scanning window 16. Thus, reflected laser light from the UPC symbol enters the fiber optic bundle 38 which conveys the light through a narrow bandpass optical filter 42 to a light sensor such as a photomultiplier 44. The optical filter 42 is required to block out ambient light at wavelengths other than those close to the laser wavelength of 623.8 nanometers.

As previously mentioned, the scanning window 16 is a long and narrow rectangle in the order of two inches long by seven inches wide. The planar surface 40 of the fiber optic bundle 38 will therefore have approximately the same horizontal dimension but at the region of the filter 42, it will have assumed a circular cross section. Fiber optic bundle 38 therefore becomes a form of rectangle-to-circle converter and provides a means of keeping the system sensitivity and the bandpass constant over the entire scanning plane. As previously indicated, it is positioned to provide for an unobstructed optical path for the scanning beam which, when reflected from the UPC symbol, passes through the fiber optic bundle 38 and filter 42 to the photomultiplier 44 which generates an electrical signal which is directed to the video signal processor 46 which will be described in detail in connection with the description of FIG. 5.

Galvanometers 30 and 32 generate the scanning pattern which must illuminate the UPC symbols that are swept across the scanning window 16. The deflection of galvanometers 30 and 32 is controlled by the circuitry illustrated in block form in FIG. 2 which includes a programmable read-only-memory circuit 48 that includes the necessary memory address decoder and output amplifiers and which is programmed to produce digital intelligence at the output terminals upon the occurrence of applied clock pulses. As shown in FIG. 2, the output terminals of the memory circuit 48 are identified by reference letters which correspond to similarly identified waveforms illustrated in FIG. 3. Therefore, in the following description of the circuitry of FIG. 2, reference may be made to the waveforms of FIG. 3.

The read-only-memory circuit 48 generates the galvanometer drive signals for both the vertical galvanometer 30 and horizontal galvanometer 32. The read-only-memory is therefore programmed to produce the basic horizontal drive signal from terminal A and the basic vertical drive signal from terminal G. Waveforms A and G of FIG. 3 illustrate typical signals generated at these terminals.

Figure 3:
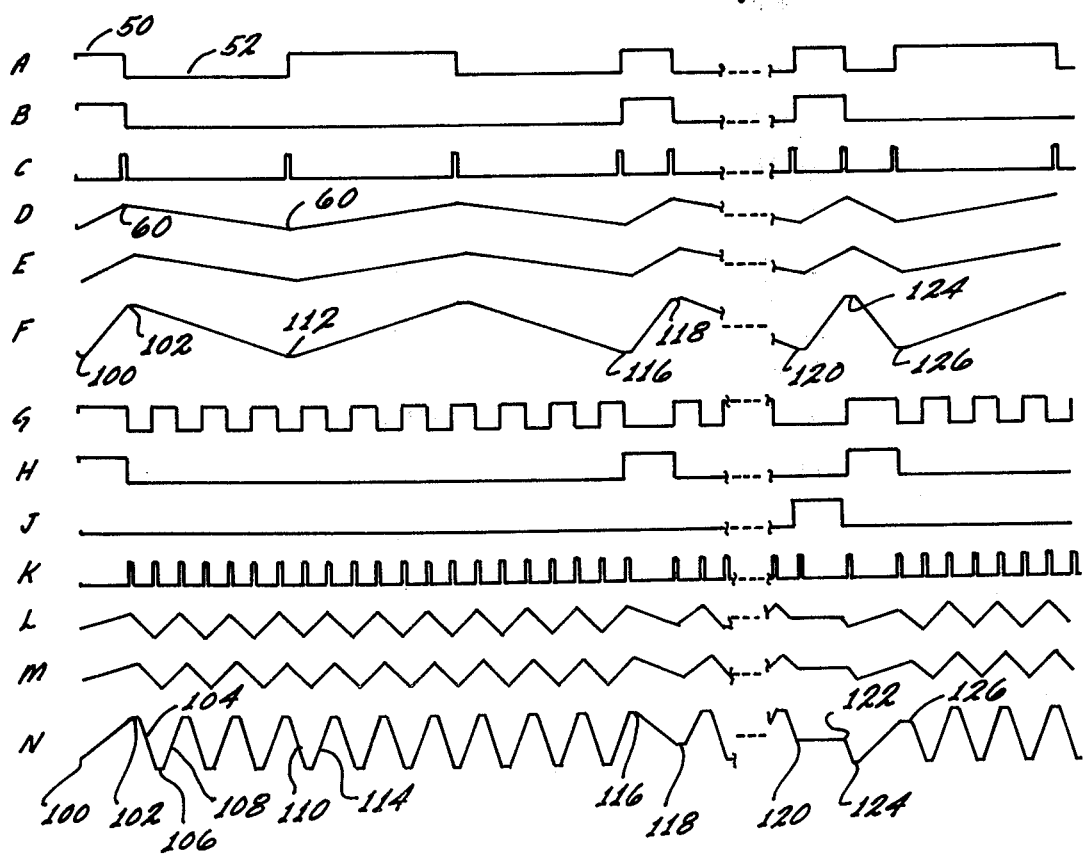
FIG. 3 illustrates waveforms of the electrical signals appearing at various points in the galvanometer drive circuitry of FIG. 2.

It will be noted that the basic horizontal drive signal A of FIG. 3 comprises signals of both short periods 50 and long periods 52. It will also be noted that while a short period waveform 50 is being generated there will be not phase reversals in the basic vertical drive signal G. This situation exists when it is desired to provide a very rapid horizontal scan with a correspondingly slow vertical scan such as is illustrated by scan 54 in FIG. 4A.

During the existence of a long period waveform 52, it will be noted that the basic vertical drive signal G clocks out six and two-thirds (6 ⅔) pulses. Therefore, the vertical galvanometer 30 of FIG. 2 will cause the laser beam to be swept six and two-thirds (6 ⅔) times for each horizontal sweep produced by the horizontal galvanometer 32. The resulting scanner pattern is illustrated in each of the sequences of FIG. 4 as will be subsequently explained.

The output terminal A of the ROM circuitry 48 of FIG. 2 is coupled to a phase adjustment circuit 56 which is provided to manually adjust, if necessary, the phase of the signal at terminal A into a proper relationship with the vertical signal appearing at terminal G. Once the proper phase is established, further adjustment of the circuit 56 is no longer necessary. The output of the phase adjustment circuit 56 is coupled to the input terminal of an integrator 58 which integrates the binary sinal A to produce the signal D as shown in FIG. 3. It will be appreciated that integrator 58 should produce an output waveform D that is of consistent peak amplitude, irrespective of whether its input signal has a short period 50 or a long period 52. Therefore, the ROM in circuit 48 is programmed to produce a gain control signal B which is present only during the existence of a short period waveform 50 and which adjusts integrator 58, such as by changing the value of an integrating resistor, so that the output signal D of integrator 58 is of consistent peak amplitude as shown in waveform D of FIG. 3.

In theory, the horizontal galvanometer 32 could be driven by the signal represented by waveform D of FIG. 3. However, inertia prevents the galvanometer from actually following the sharp reversals 60 that exist in the integrated waveform D. Therefore, the sharp reversals are eliminated by generating a horizontal galvanometer drive signal F by summing together the waveform D with an identical waveform E which is derived from a slightly delayed waveform D. Accordingly, a narrow square wave pulse as shown in waveform C of FIG. 3, is generated, preferably through a one-shot multivibrator within the memory circuit 48 and is coupled into a delay circuit 62 along with waveform A from the phase adjustment circuit 56.

The output of the delay circuit 62 is a waveform identical with waveform A but delayed by an amount equal to the length of the positive going pulses in the waveform C. This signal is introduced into an integrator 64 which produces at its output the waveform E as shown in FIG. 3. It will be noted that waveform E and waveform D are identical except that the waveform E is slightly displaced by an amount equal to the length of the pulse from the delay waveform C.

The output of integrator 58 and the output of integrator 64 are coupled together in a summation circuit 66, the output of which is coupled through an amplifier to produce a signal represented by the waveform F, a signal that the horizontal galvanometer follows. It will be appreciated that the length of the delay signal C will necessarily depend upon the inertia of the galvanometer; larger inertias will require longer delay signals to properly follow the drive signal.

In precisely the same manner, the programmable read-only-memory in circuit 48 generates the basic vertical drive signal G, the gain control signals H, and an additional signal identified as a "crossover" signal J which, when present, controls the operation of the vertical integrator circuits to freeze the vertical amplitude at the level existing upon initiation of the crossover command, and thus permits the horizontal sweep to take the scanning laser spot across the horizontal dimension of the window 16 with no vertical movement. Therefore, the output terminal G of the memory circuit 48 is coupled to the integrator 68 and also through the delay circuit 70, along with the delay signals from memory circuit terminal K, to the integrator 72. Additional inputs to integrators 68 and 72 are the gain control signal H and the vertical crossover signal J, both of which are produced by the PROM within the circuit 48. The waveform L of FIG. 3 is produced at the output of integrator 68 and the identical but delayed waveform M is generated by the integrator 72. These two waveforms are added in the summation circuits 74 and are amplified to produce the drive signal N for the vertical galvanometer 30 of FIG. 2.

In the embodiment of the invention being described, careful consideration has been given to the design of the scanning pattern generated by the circuitry described above. Since it would simplify subsequent data processing circuitry, if the analysis of data was consistently from the outside guard pattern toward the center patterns, the direction of the laser scan is reversed for alternate complete scan patterns. Further, in order to improve the signal-to-noise ratio of the read-out signal the laser power may be increased, while still complying with Class I operation prescribed by the Bureau of Radiological Health, if a great plurality of individual scans are used to make up the complete pattern. An additional consideration in the selection of the scan pattern is the interleg angle (i.e., the angle between scan traces) of the pattern and the scanning repeat period. In the embodiment being described, the interleg angle for the scan pattern has been selected to be approximately 45° in order to eliminate the possibility of a portion of a UPC symbol from passing undetected through the scan pattern, and the scan repeat period has been selected to approximately 0.028 second with each leg having a "writing" speed substantially equal to the other, independently of whether it is part of a zigzag trace or a linear trace.

Figure 4A:
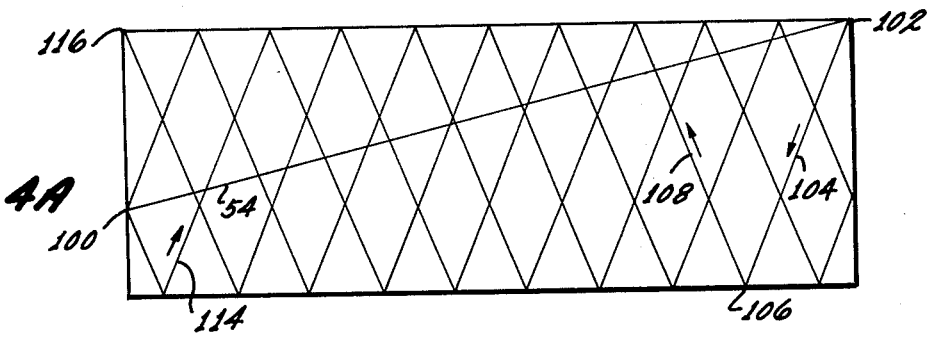
FIGS. 4A–4D are illustrations of various sequences of the scan pattern traced by the galvanometer deflected laser beam with FIG. 4E illustrating a composite of FIGS. 4A–4D and forming a complete scan pattern.
Figure 4B:
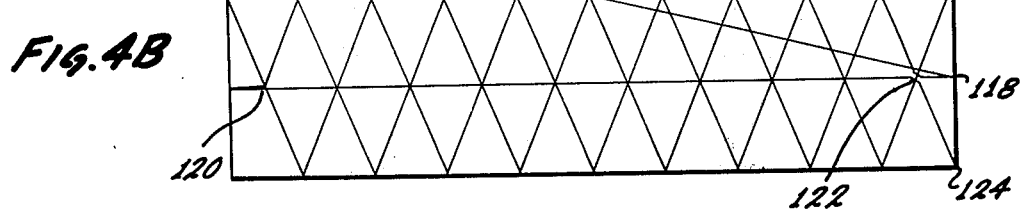
Figure 4C:
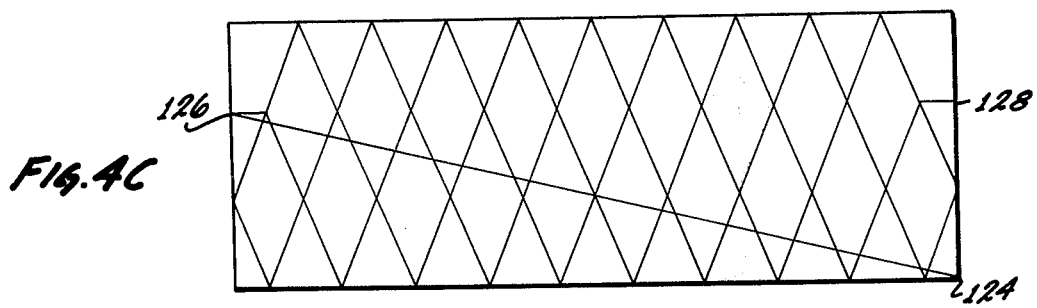
Figure 4D:
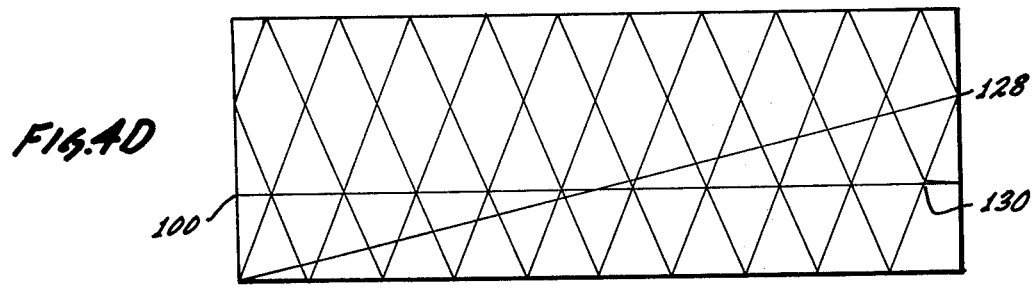
Figure 4E:
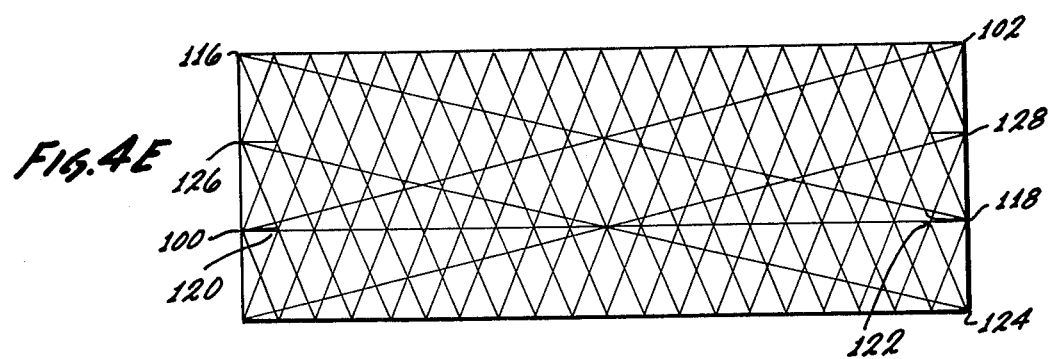

FIG. 4 illustrates four scanning pattern sequences identified as FIGS. 4A, 4B, 4C and 4D which, when combined together, form the complete scanning sequence illustrated in FIG. 4E. Because of the complexity of the complete scanning pattern of FIG. 4E, the following description will be concerned with the sequences of FIGS. 4A–4D and the various drive signals of FIG. 3 that produce the various scan patterns.

It will be assumed that the sweeping scan pattern will start at the point identified by the reference number 100 at the left margin of the scan pattern and one-third the distance from the bottom of the pattern of FIG. 4A. This point corresponds to the points identified by the reference numeral 100 on the horizontal galvanometer drive signal waveform F, which is shown in FIG. 3 at its most negative value, thus corresponding to the left margin of the scan pattern. This point is also identified by the reference numeral 100 shown at the beginning of the vertical galvanometer drive signal waveform N which slopes upward from a point one-third up from its most negative value, thus corresponding to a similar point one-third up from the bottom of the waveform pattern of FIG. 4A.

Because the memory in circuit 48 is programmed to clock out a horizontal gain signal B at the starting point 100, the horizontal drive waveform F rapidly rises to its maximum value 102, indicated in FIG. 4A by a rapid scan from the point 100 to the point 102. Similarly, the vertical gain control signal H which is designed to reduce the slope of the vertical drive signal N to one-third its normal value, causes the vertical galvanometer to sweep the pattern from its starting point 100 to its maximum value 102 as illustrated in FIG. 4A.

At their maximum values identified by reference numeral 102 of FIG. 3, horizontal waveform F and the vertical waveform N reverse directions with the horizontal waveform F assuming its normal gradual slope representing a normal horizontal sweep of the scan pattern while the vertical waveform N assumes its normal rapid scanning frequency. Thus, from the maximum value point 102, the vertical waveform N starts a negative-going sweep 104 to its most negative point 106 whereupon it reverses into a positive-going slope 108 as shown in FIG. 3 and also on the scan pattern of FIG. 4A.

During the slow negative-going portion of the horizontal waveform F, the vertical waveform N will make six and two-thirds vertical sweeps to the point 110 in the waveform N of FIG. 3 that corresponds to the point of reversal 112 of the horizontal waveform F. The horizontal waveform F then reverses and starts its upward slope to its maximum value while the vertical waveform N will continue down to its lowest value and then reverse to the beginning upward sweep 114. The vertical waveform N continues to sweep six and two-thirds times for each normal horizontal sweep of waveform F and completes its fourth horizontal sweep at its maximum value point 116 corresponding to the minimum value of the horizontal waveform F as shown in FIG. 3 and represented by the point of 116 in the upper left corner of the scanning sequence shown in FIG. 4A.

Having started a scan pattern from left to right during the sequence illustrated in FIG. 4A, it is now desired to start a reverse scan pattern in the next sequence illustrated in FIG. 4B. Accordingly, the memory in the circuit 48 now clocks out a horizontal gain signal B which forces the horizontal galvanometer drive signal F into its steep positive-going slope that results in a fast scan from points 116 to 118 in the sequence illustrated in FIG. 4B. During this period, a vertical gain signal H is clocked from the memory forcing the vertical waveform N into its reduced slope mode so that at the point 118 the value of the vertical signal waveform is one-third its maximum value. At this point, 118, the horizontal signal waveform F will reverse and sweep at its normal sweep speed while the vertical waveform N sweeps at its normal vertical sweep rate.

Near the end of the fourth horizontal sweep of the sequence illustrated in FIG. 4B, it is desired to halt the vertical sweep at a point 120 that is one-third the maximum value of the vertical drive signal. Therefore, the memory in circuit 48 clocks out a vertical crossover pulse J, as shown in FIG. 3, which freezes the vertical amplitude at the level of the vertical signal that exists at point 120 and for a period that extends during the duration of the crossover pulse J. As shown in waveform N of FIG. 3, the value of the vertical amplitude existing at point 120 will continue to point 122 at which time, it will continue its downward slope to the point identified by the numeral 124. This is illustrated in the sequence of FIG. 4B by the horizontal sweep from point 120 to the point 122 and thence downward to the point 124 representing the end of this sequence.

Having described the operation of two sequences of the scanning operation of FIG. 4 and the development of the galvanometer drive waveforms, it is deemed unnecessary to describe in detail the sequences illustrated in FIGS. 4C and 4D other than to mention that the normal scanning and rapid sweeping continues as shown in FIG. 4D to the point 130. At this time, a vertical crossover signal J will be clocked from the memory circuit to freeze the vertical amplitude of the pattern until it reaches the end of the sequence at the point 100 where the sequences are repeated and described in connection with FIGS. 4A et seq.

As previously mentioned, a portion of the scanned laser light impinging upon a UPC symbol is reflected back through the scanning window 16 to the planar surface 40 of the fiber optic bundle 38 as shown in FIG. 2. The surface 40 has a horizontal dimension substantially identical with the outline of the scanning pattern illustrated in FIG. 4 and a fiber optic bundle is curved and reformed into a circular cross-section as it contacts the optical filter 42 and enters the photomultipler 44.

FIG. 5 illustrates both block diagrams of the various components that go into the video processor as well as typical waveforms produced by each of the components of the processor. Photomultiplier 44 therefore produces an output waveform 44a, the amplitude of which varies according to the light level sensed by the photomultiplier 44 as the laser beam scans across one bar of a UPC symbol. Signal 44a is then applied to a preamplifier 76 which produces a higher amplitude waveform 76a that is properly matched to the subsequent circuitry but which is otherwise a representation of the photomultiplier signal 44a.

Preamplifier 76 is coupled to a low pass filter 78 which removes the extraneous high-frequencies which do not carry significant signal information and improves the signal-to-noise ratio as shown at 78a. The output signal 78a of the low-pass filter 78 is then introduced into a differentiator circuit 80 which produces the waveform shown at 80a. This differentiated signal 80a is then applied to a Schmitt window circuit 82 and also to a second differentiation circuit 84.

If the amplitude of the differentiated signal 80a is greater than a predetermined threshold level that is selected according to the overall amplitude of the waveform, then the Schmitt window circuitry 82 will be triggered and will produce an output signal 82a that indicates the general location of the optical transsition sensed by the photomultiplier 44. The second differentiation circuit 84 produces the signal 84a which very accurately locates the point of the optical transition at the zero crossing points of the waveform 84a. However, the output signal 84a is very susceptible to noise and may produce many zero crossings. Therefore, the output of the second differentiation circuit 84 is coupled through a zero crossover detector 86 and is logically coupled in the gate 88 along with the output signal 82a from the Schmitt window circuit 82 to produce a state change only when both the signals from the Schmitt window 82 and the zero cross detector 86 indicate such a change. Thus, where the Schmitt circuit 82 has poor accuracy but low noise susceptibility, the zero crossing detector 86 has high accuracy but poor noise rejection; therefore, the output signal 88a, being a logical combination of these two signals 82a and 86a, accurately reflects the optical change of state sensed by the photomultiplier 44 as the laser beam is scanned across the various bars and spaces of the UPC symbol. This output signal 88a is then analyzed by a subsequent decode logic circuitry which forms no part of this invention.

What is claimed is:

1. An optical scanner comprising:
   means for generating a pencil of substantially monochromatic light;
   first means interposed in the path of said pencil for selectively deflecting said pencil in a first plane;
   second means interposed in the deflected path of said pencil for selectively deflecting said pencil in a second plane at right angles to said first plane; and for projecting said deflected pencil to a scan window;

reading means positioned to detect the light reflected from an object at said scan window; and circuit means coupled to said first and said second means for controlling the amplitude and deflection rates thereof, said circuit means including circuitry for producing deflection drive signals having linear slopes with horizontal portions at each slope reversal to enable the deflecting means to follow said deflection drive signals.

2. The scanner claimed in claim 1 wherein said first and second means comprise galvanometers having reflecting elements for deflecting the light pencil according to the amplitude and frequency of the drive signals generated by said circuit means.

3. The scanner claimed in claim 1 wherein said circuit means includes digital memory circuitry programmed to generate first and second deflection signals for respectively controlling said first and second means.

4. The scanner claimed in claim 3 wherein said memory circuitry includes a read-only-memory for generating binary signals representing said first and said second deflection signals, and wherein said circuit means includes integrating circuitry coupled to said read-only-memory for producing substantially linear sloping first and second drive signals from said binary signals.

5. The scanning system claimed in claim 3 wherein said read-only-memory is programmed to generate first binary deflection signals with a normal scanning frequency that is six and two-thirds that of said second binary deflection signals.

6. The scanning system claimed in claim 5 wherein each of said first and second binary deflection signals produced by said read-only-memory is introduced into a pair of substantially identical integrator circuits, the output signals of which are summed to produce drive signals, one of said pair of integrator circuits producing an output signal that is delayed by a predetermined time depending upon the inertia of its associated galvanometer.

7. The scanning system claimed in claim 1 wherein said reading means includes a fiber optic bundle having an entrance aperture configuration substantially identical with the configuration of said scanning window, the exit aperture of said fiber optic bundle being configured to be optically coupled to a photomultiplier.

8. The scanning system claimed in claim 7 further including a narrow pass-band optical filter interposed between the exit aperture of said fiber optic bundle and said photomultiplier, said filter having a pass-band that includes the frequency of monochromatic light generated by said generating means whereby said photomultiplier will detect only that light reflected from the coded symbols by impingement of said pencil of substantially monochromatic light.

9. The optical scanner claimed in claim 1 wherein said circuit means includes:

a memory programmed to generate vertical deflection signals and horizontal deflection signals;

delay circuitry responsive to at least said vertical deflection signal for generating a delayed vertical deflection signal;

means for integrating said vertical deflection signal and said delayed vertical deflection signal to produce identical but displaced sawtooth waveforms with linear slopes; and means for combining said integrated vertical deflection signal and said integrated delayed vertical deflection signal to produce vertical drive signals to said deflecting means, said drive signals having linear slopes except for horizontal portions at each slope reversal to permit deflecting means to follow said drive signals.

* * * * *